(12) United States Patent
Iwamoto

(10) Patent No.: US 12,715,693 B2
(45) Date of Patent: Aug. 25, 2026

(54) CONVEYANCE SYSTEM

(71) Applicant: TOYOTA JIDOSHA KABUSHIKI KAISHA, Aichi-ken (JP)

(72) Inventor: Kunihiro Iwamoto, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 288 days.

(21) Appl. No.: 18/669,439

(22) Filed: May 20, 2024

(65) Prior Publication Data

US 2024/0400305 A1 Dec. 5, 2024

(30) Foreign Application Priority Data

May 31, 2023 (JP) ................................ 2023-090051

(51) Int. Cl.
*B65G 1/06* (2006.01)

(52) U.S. Cl.
CPC .................................. *B65G 1/065* (2013.01)

(58) Field of Classification Search
CPC .............................. B65G 1/0435; B65G 1/065
See application file for complete search history.

(56) References Cited

U.S. PATENT DOCUMENTS 5,829,948 A * 11/1998 Becklund .............. B66F 7/0625 254/8 R
11,305,973 B2 * 4/2022 Chang ................. B66F 9/07504

FOREIGN PATENT DOCUMENTS

FR 3100029 A1 * 2/2021 ........... A47G 29/141
JP 2012153482 A * 8/2012 ........... B65G 1/0435
JP 5104558 B2 12/2012
JP 5427561 B2 2/2014
JP 7750261 B2 * 10/2025 .............. B66F 9/063
WO WO-2006095047 A1 * 9/2006 ........... B65G 1/0435

* cited by examiner

*Primary Examiner* — Gene O Crawford
(74) *Attorney, Agent, or Firm* — HAUPTMAN HAM, LLP

(57) ABSTRACT

A conveyance system that improves the lifespan of an expansion and contraction part that raises and lowers a mounting base is achieved. A conveyance system according to an embodiment includes a movable moving unit, an expansion and contraction part provided in the moving unit and expanding and contracting in a vertical direction, a mounting base attached to a tip of the expansion and contraction part, and a control unit configured to select a direction from the moving unit to a shelf when a package is transferred between the mounting base and the shelf so that stress loads accumulated in the expansion and contraction part are leveled in a circumferential direction of the expansion and contraction part.

5 Claims, 4 Drawing Sheets

CONVEYANCE SYSTEM

CROSS REFERENCE TO RELATED APPLICATIONS

This application is based upon and claims the benefit of priority from Japanese patent application No. 2023-090051, filed on May 31, 2023, the disclosure of which is incorporated herein in its entirety by reference.

BACKGROUND

The present disclosure relates to a conveyance system, and in particular to a technology for transferring a package between a conveyance robot and a shelf.

Japanese Patent No. 5104558 discloses a technology related to a conveyance vehicle capable of transferring a package to and from a package mounting unit. After detecting a deviation amount of the package transferred to the conveyance vehicle in the traveling direction, the conveyance vehicle transfers the package to the package mounting unit, travels a compensation amount in accordance with the deviation amount, and transfers the package from the package mounting unit to a storage unit.

SUMMARY

When a package is transferred between a shelf and a mounting base, there is an uneven load on the mounting base. Therefore, stress loads accumulate on a expansion and contraction part that raises and lowers the mounting base, possibly leading to a decrease in the durability of the expansion and contraction part.

The present disclosure has been made in view of such a problem and achieves a conveyance system that improves the lifespan of an expansion and contraction part that raises and lowers a mounting base.

A conveyance system according to an aspect of the present disclosure includes:

- a movable moving unit;
- an expansion and contraction part provided in the moving unit and expanding and contracting in an up-down direction;
- a mounting base attached to a tip of the expansion and contraction part; and
- a control unit configured to select a transfer direction so that stress loads accumulated in the expansion and contraction part are leveled in a circumferential direction of the expansion and contraction part, the transfer direction being a direction from the moving unit to a shelf when a package is transferred between the mounting base and the shelf.

According to the present disclosure, it is possible to achieve a conveyance system that improves the lifespan of an expansion and contraction part that raises and lowers a mounting base.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A specific embodiment to which the present disclosure is applied will now be described in detail with reference to the drawings. However, the present disclosure is not limited to the following embodiments. In addition, for clarity of explanation, the following description and drawings are simplified as appropriate.

First Embodiment

A conveyance system according to the first embodiment will be described below with reference to the drawings. The conveyance system includes a conveyance robot for conveying a package. The conveyance system may further include a server for managing the conveyance of the package by the conveyance robot. In this case, some of the functions provided by the conveyance robot according to the first embodiment may be provided in the server. It should be noted that a system where processing is completed in the conveyance robot may also be included in the conveyance system according to the first embodiment.

Figure 1:
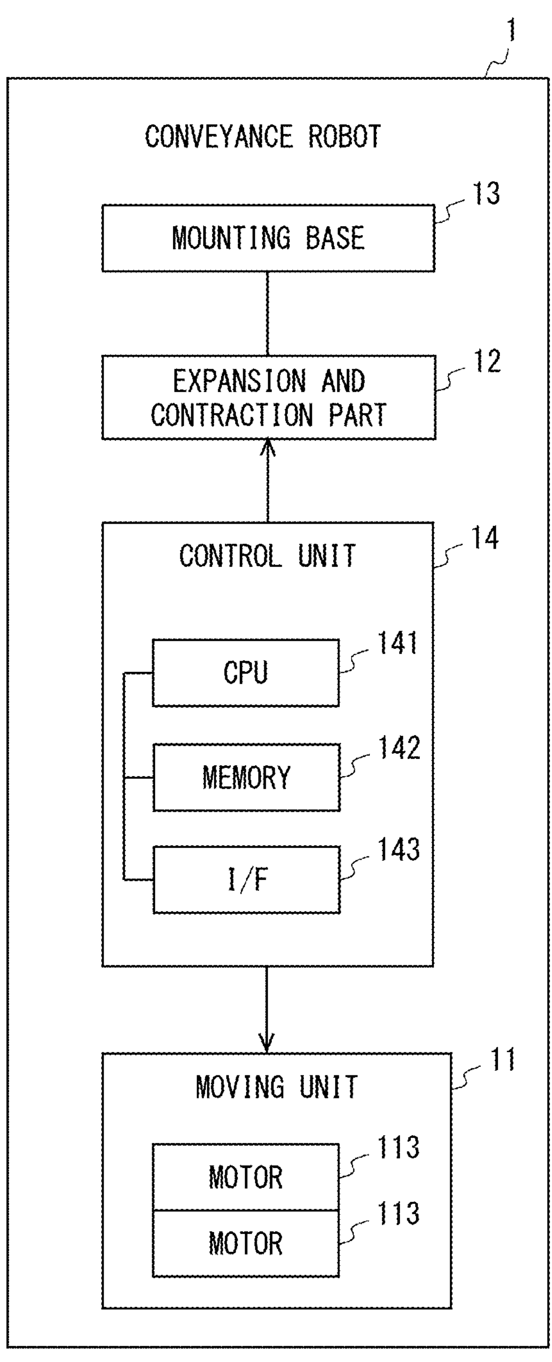
FIG. 1 is a diagram for explaining a functional configuration of a conveyance robot according to a first embodiment.
Figure 2:
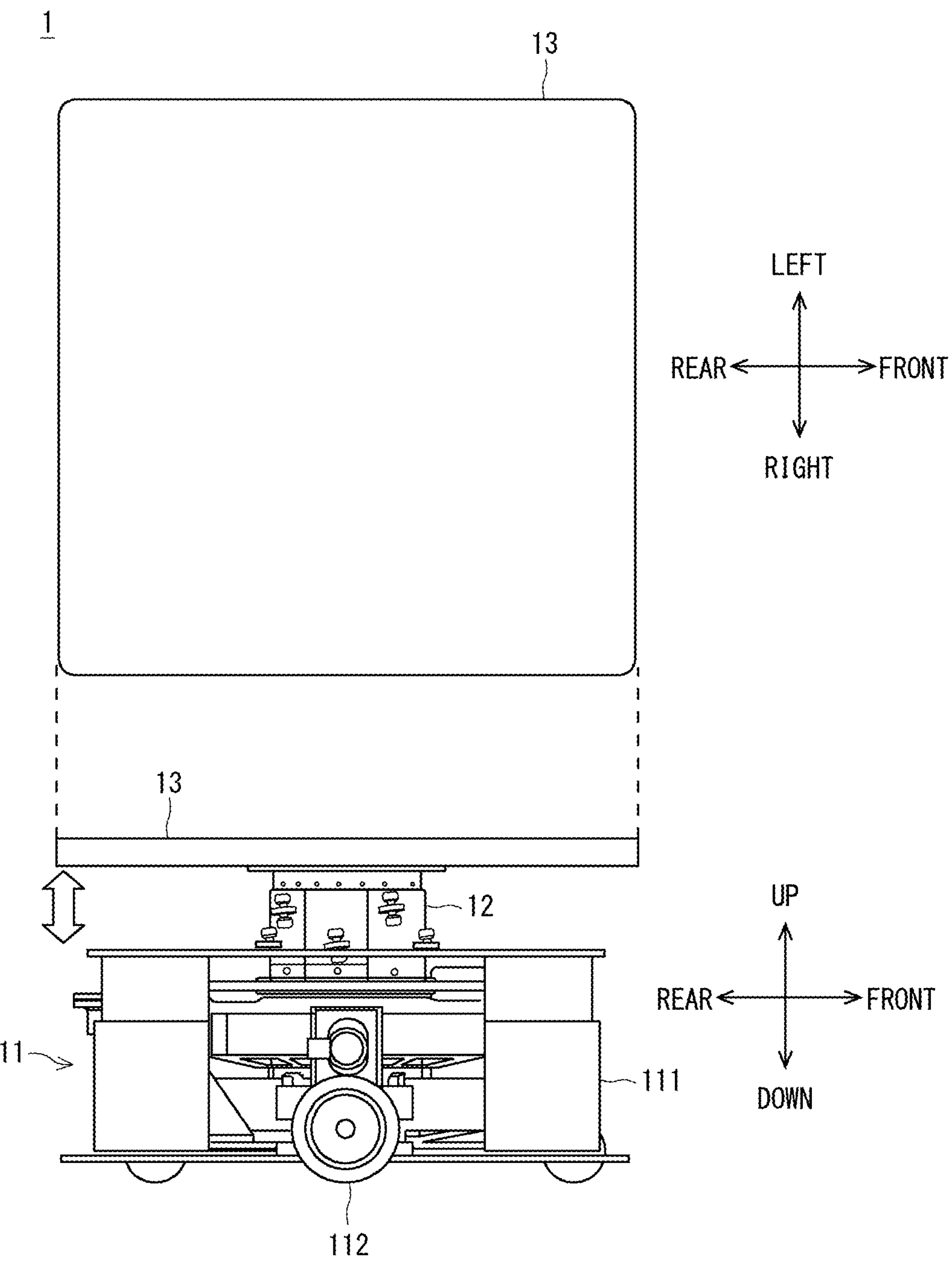
FIG. 2 is a side view and a top view of the conveyance robot according to the first embodiment.
Figure 3:
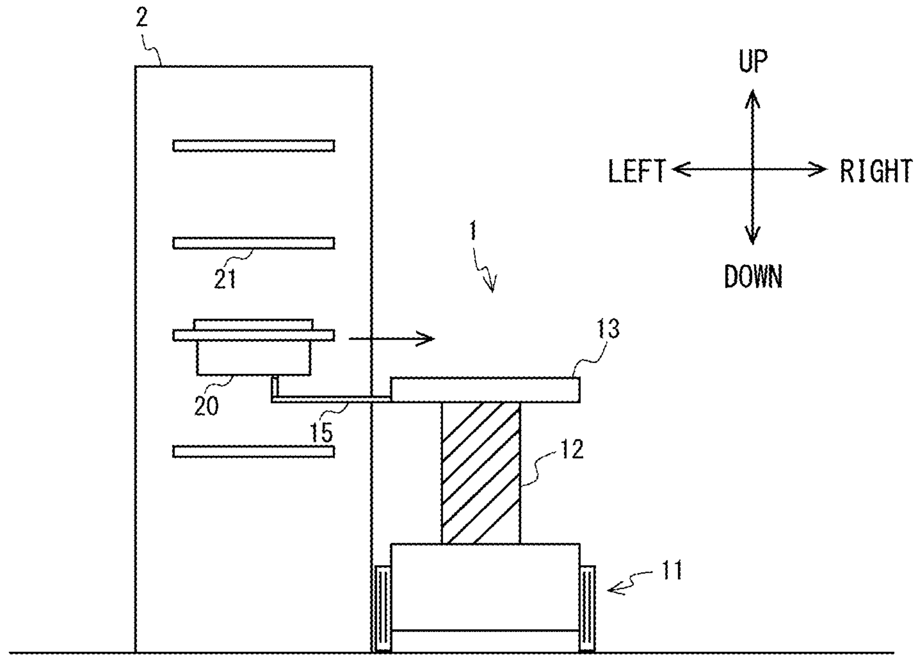
FIG. 3 is a diagram for explaining an operation of the conveyance robot according to the first embodiment.
Figure 4:
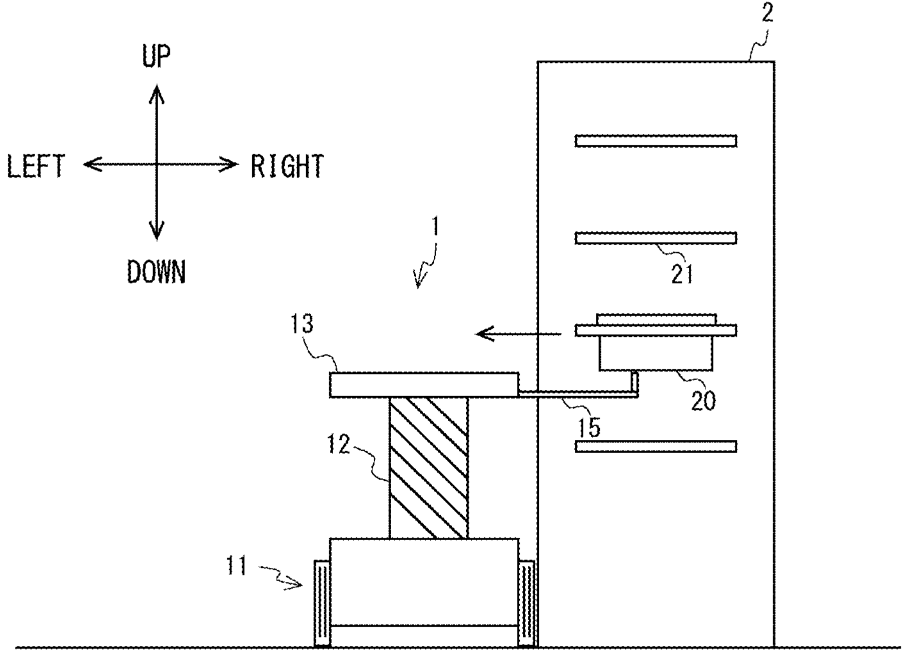
FIG. 4 is a diagram for explaining the operation of the conveyance robot according to the first embodiment.

FIG. 1 is a diagram for explaining the functional configuration of the conveyance robot 1 according to the first embodiment. FIG. 2 is a side view and a top view of the conveyance robot 1. In the descriptions of FIGS. 2, 3, and 4, the up-down direction, the left-right direction, and the front-rear direction are the directions relative to the orientation of the conveyance robot 1.

The conveyance robot 1 is configured to transfer a package (e.g., returnable box) to and from a shelf. The conveyance robot 1 conveys the package and stores the conveyed package in the shelf. The conveyance robot 1 also takes out the package from the shelf and conveys the retrieved package. The conveyance system may include a shelf.

The shelf may be configured to store packages at a plurality of levels. The packages stored in the shelf are supported in a state that they can be transferred to the conveyance robot 1. For example, both sides (e.g., brim) of the package (e.g., returnable box) may be supported by support members. The shelf 2 may also include a guide rail to guide the raising and lowering of a mounting base 13, which will be described later.

The conveyance robot 1 includes a moving unit 11, an expansion and contraction part 12, the mounting base 13, and a control unit 14. The orientation of the conveyance robot 1 described above corresponds to the orientation of the moving unit 11.

The moving unit 11 includes a main body 111, a pair of wheels 112, and a motor 113. The pair of wheels 112 are rotatably provided on the right and left sides of the main body 111, respectively. The motor 113 rotates each wheel 112 through a reduction gear or the like. More casters which cannot provide a driving force may be provided. The motor 113 rotates each wheel 112 in response to a control signal from the control unit 14. As a result, the main body 111 moves to any position. The moving unit 11 may control the movement of the conveyance robot 1 by performing well-known control such as feedback control and robust control based on rotation information of the wheels 112 detected by a rotation sensor provided in each wheel 112.

When a package is transferred to and from the shelf, the main body 111 moves in front of the shelf. At this time, the moving unit 11 orients the predetermined direction of the main body 111 to the shelf based on the above control signal. The predetermined direction may be, for example, a left direction or a right direction. The predetermined direction may be a forward direction or a backward direction.

The expansion and contraction part 12 is provided on the moving unit 11, that is, on the main body 111. As the expansion and contraction part 12 expands and contracts in the vertical direction, the mounting base 13 is raised and lowered. The expansion and contraction part 12 may be configured as a telescopic-type expansion and contraction mechanism that expands and contracts in the up-down direction. The expansion and contraction part 12 expands and contracts in response to a control signal from the control unit 14. Thus, the height of the mounting base 13 is controlled so that the package can be transferred between the mounting base 13 and the shelf.

The mounting base 13 is provided at the tip of the expansion and contraction part 12. The mounting base 13 is a platform on which a package can be mounted and is also called a top plate. A groove (not shown) for fitting with the guide rail may be formed in the mounting base 13. In this case, the mounting base 13 may be rotatable about a vertical axis.

The conveyance robot 1 may include an extendable arm (e.g., arm with a hook), not shown, for moving the package in and out of the shelf. The extendable arm may be attached to the mounting base 13. When the extendable arm extends and contracts in response to a control signal from the control unit 14, the package is transferred between the shelf and the mounting base 13. However, the method of transferring the package to and from the shelf is not limited to the method using the extendable arm. For example, the mounting base 13 itself may be translated toward the shelf. The mounting base 13 may also be provided with an articulated robotic arm that moves the package in and out of the shelf. The extendable arm or robotic arm may be provided on the shelf side.

The control unit 14 is configured as hardware, centered around a microcomputer including, for example, a CPU (Central Processing Unit) 141, a memory 142, and an interface unit (I/F) 143. The CPU 141 performs control processing, arithmetic processing, and the like. The memory 142 includes a ROM (Read Only Memory) in which control programs, arithmetic programs, and the like executed by the CPU 141 are stored. The interface unit 143 inputs and outputs signals to and from the outside. The CPU 141, the memory 142, and the interface unit 143 are connected to each other via a data bus.

The control unit 14 has a function of controlling the operation of the moving unit 11 and the expansion and contraction part 12. The control unit 14 may control the operation of the moving unit 11 and the expansion and contraction part 12 or the like based on information such as distance information detected by a sensor and map information of a moving environment.

The control unit 14 controls the rotation of each wheel 112 by transmitting a control signal to the moving unit 11 to move the main body 111 to any position. At this time, the direction of the main body 111 is also changed to any direction. The control unit 14 also controls the height of the mounting base 13 by transmitting a control signal to the expansion and contraction part 12. The control unit 14 may also transfer the package between the mounting base 13 and the shelf by transmitting a control signal to the extendable arm.

The control unit 14 also has a function (referred to as a selection function) for selecting the direction from the moving unit 11 to the shelf when transferring a package. This direction is also referred to as a transfer direction. In other words, the control unit 14 selects which direction of the main body 111 is oriented to the opening of the shelf when transferring a package. The direction of the shelf as seen from the moving unit 11 can be considered as the direction of the shelf as seen from the conveyance robot 1. The control unit 14 selects the transfer direction so that the stress loads accumulated in the expansion and contraction part 12 are leveled in the circumferential direction of the expansion and contraction part 12.

Referring to FIGS. 3 and 4, the operation of the conveyance robot 1 will be specifically described. FIG. 3 shows the operation of the conveyance robot 1 when the control unit 14 selects the left direction. FIG. 4 shows the operation of the conveyance robot 1 when the control unit 14 selects the right direction.

The shelf 2 stores a package 20. Both sides of the package 20 are supported by support members 21. When the conveyance robot 1 takes out the package 20 from the shelf 2, the expansion and contraction part 12 of the conveyance robot 1 raises the mounting base 13 to the height of the package 20. Then, the package 20 is pulled by using the extendable arm 15 or the like.

In the case of FIG. 3, compressive stress is generated on the left side of the expansion and contraction part 12 and tensile stress is generated on the right side of the expansion and contraction part 12. In the case of FIG. 4, compressive stress is applied on the right side of the expansion and contraction part 12 and tensile stress is generated on the left side of expansion and contraction part 12. The same applies when a package mounted on the mounting base 13 is stored in the shelf 2. It is known that the stress generated at the proximal end of the expansion and contraction part 12 is large.

When the number of times the control unit 14 selects the left direction is large, the compressive stress tends to accumulate on the left side of the expansion and contraction part 12 and the tensile stress tends to accumulate on the right side of expansion and contraction part 12. Similarly, when the number of times the control unit 14 selects the right direction is large, the compressive stress tends to accumulate on the right side of the expansion and contraction part 12 and the tensile stress tends to accumulate on the left side of the expansion and contraction part 12.

Therefore, the control unit 14 may select the transfer direction so that the number of times the left direction is selected is close to the number of times the right direction is selected. For example, the control unit 14 may randomly select the transfer direction from the left direction and the right direction. Further, the control unit 14 may select the direction with fewer past selections from both the left direction and the right direction based on the history (referred to as a direction history) indicating the transfer direction selected in the past. Further, the control unit 14 may select a direction different from the direction most recently selected as the transfer direction. By preventing the same direction from being selected consecutively, stress accumulation in the expansion and contraction part 12 can be avoided.

Further, the heavier the weight of the package, the greater the stress generated in the expansion and contraction part 12.

Therefore, the control unit 14 may further select the transfer direction based on a history (which is referred to as a weight history) indicating the weight of a package transferred between the mounting base 13 and the shelf 2 in the past. The weight of a package transferred in the past may be associated with the transfer direction selected for transferring a package.

The control unit 14 may select the transfer direction so that the direction in which the heavy package has been transferred in the past is less likely to be selected. For example, the control unit 14 may calculate the sum of the weights of the packages selected in the left direction as the transfer direction and the sum of the weights of the packages selected in the right direction as the transfer direction, and then select the direction with the smaller sum. Alternatively, the control unit 14 may select the direction with fewer occurrences of being selected as the transfer direction for a package with a weight exceeding a threshold. The control unit 14 may also take into account the weight of the package when selecting the transfer direction. The conveyance robot 1 may receive weight information about the package from the server.

Furthermore, the greater the distance between the conveyance robot 1 and the shelf 2, the greater the stress generated in the expansion and contraction part 12. Therefore, the control unit 14 may further select the transfer direction based on a history (which is referred to as a distance history) showing the distance (which is referred to as a transfer distance) between the mounting base 13 and the shelf 2 when the package has been transferred between the mounting base 13 and the shelf 2 in the past. The control unit 14 calculates, for example, a product of the weight of each of several packages selected with the left direction as the transfer direction and the transfer distance when the package has been transferred. It then calculates the sum of these products. Similarly, the control unit 14 calculates, for example, a product of the weight of each of several packages selected with the right direction as the transfer direction and the transfer distance when the package has been transferred. It then calculates the sum of these products. Then, the control unit 14 may select the direction with the smaller sum as the transfer direction.

It should be noted that while the example has been given for the case where the transfer direction is the left or right direction, similar explanations are applicable when the transfer direction is the forward or backward direction. Furthermore, it is also possible for the transfer direction to be selected from three or more directions (e.g., forward, backward, left, right).

The control unit 14 levels the stress loads accumulated in the expansion and contraction part 12 in the circumferential direction of the expansion and contraction part 12. Therefore, the conveyance system according to the first embodiment prevents a decrease in the durability of the expansion and contraction part 12, thus improving the lifespan of the expansion and contraction part.

The conveyance system may not have a configuration in which all of the functional elements are integrated into the conveyance robot 1. For example, the selection function of the control unit 14 may be performed by an arithmetic unit provided by a server connected to the conveyance robot 1 via a network. In this case, the server transmits the selected direction to the conveyance robot 1. Further, the direction history, weight history, distance history, etc. may be stored in the server. Thus, the conveyance system may be configured to include the server and the conveyance robot 1. The processor and memory described above may be located in the server, or in both the conveyance robot 1 and the server.

The above-described program includes instructions (or software codes) that, when loaded into a computer, cause the computer to perform one or more of the functions. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above embodiments and may be modified accordingly to the extent that it does not deviate from the purpose.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:
- a movable moving unit;
- an expansion and contraction part provided in the moving unit and expanding and contracting in an up-down direction;
- a mounting base attached to a tip of the expansion and contraction part; and
- a control unit configured to select a transfer direction so that stress loads accumulated in the expansion and contraction part are leveled in a circumferential direction of the expansion and contraction part, the transfer direction being a direction from the moving unit to a shelf when a package is transferred between the mounting base and the shelf.

2. The conveyance system according to claim 1, wherein the control unit selects the transfer direction based on a direction history indicating a transfer direction previously selected by the control unit.

3. The conveyance system according to claim 2, wherein the control unit further selects the transfer direction based on a weight history indicating a weight of the package previously transferred between the mounting base and the shelf.

4. The conveyance system according to claim 2, wherein the control unit further selects the transfer direction based on a distance history indicating a distance between the mounting base and the shelf when the package has been previously transferred between the mounting base and the shelf.

5. The conveyance system according to claim 1, wherein the control unit randomly selects the transfer direction from a plurality of directions.

* * * * *